United States Patent
Schaffhauser et al.

(10) Patent No.: US 10,189,313 B2
(45) Date of Patent: Jan. 29, 2019

(54) TIRE COMPRISING AN IMPROVED TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Luc Schaffhauser, Clermont-Ferrand (FR); Vincent Tourneux, Clermont-Ferrand (FR); Laurent Huc, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 80 days.

(21) Appl. No.: 14/902,454

(22) PCT Filed: Jun. 23, 2014

(86) PCT No.: PCT/EP2014/063087
§ 371 (c)(1),
(2) Date: Dec. 31, 2015

(87) PCT Pub. No.: WO2015/000726
PCT Pub. Date: Jan. 8, 2015

(65) Prior Publication Data
US 2016/0375727 A1    Dec. 29, 2016

(30) Foreign Application Priority Data
Jul. 1, 2013  (FR) ...................................... 13 56387

(51) Int. Cl.
*B60C 11/03*     (2006.01)
*B60C 11/00*     (2006.01)

(52) U.S. Cl.
CPC ...... *B60C 11/0304* (2013.01); *B60C 11/0008* (2013.01); *B60C 11/0041* (2013.01);
(Continued)

(58) Field of Classification Search
CPC ............. B60C 11/0304; B60C 11/0008; B60C 11/0041; B60C 11/0066; B60C 11/0309; B60C 2011/0025; B60C 2011/0386
(Continued)

(56) References Cited

U.S. PATENT DOCUMENTS

| | | |
|---|---|---|
| 2005/0167019 A1 | 8/2005 | Scott et al. |
| 2007/0175557 A1 | 8/2007 | Scott et al. |

FOREIGN PATENT DOCUMENTS

| | | | | |
|---|---|---|---|---|
| JP | 11245628 A | * | 9/1999 | |
| WO | WO 2011076680 A1 | * | 6/2011 | ......... B60C 11/0058 |
| WO | WO 2013040425 A1 | * | 3/2013 | ........... B60C 1/0016 |

OTHER PUBLICATIONS

JP 11245628 A—Machine Translation.*
(Continued)

*Primary Examiner* — Matthew J Daniels
*Assistant Examiner* — Yunju Kim
(74) *Attorney, Agent, or Firm* — Cozen O'Connor

(57) ABSTRACT

Tire comprising a tread (40) extending between an outboard axial edge (45) and an inboard axial edge (46), over a width L, in which the tread comprises at least 4 circumferential ribs (411-414) separated by grooves (421-423), in which the circumferential rib (411) adjacent to the outboard axial edge of the tread extends from the outboard axial edge over a width of at least 0.6·L and comprises a portion (411a) with a width of at least 0.1·L made from a first rubber composition and an axially adjacent second portion (411b) made from a second rubber composition, the first rubber composition having values for the elastic modulus at 300% defor-
(Continued)

mation, the Shore A hardness and the complex modulus G* at 60° C. which are respectively comprised between 1.1 and 2.1 times, 0.95 times and 1.20 times, and 1.00 times and 2.10 times the corresponding values of the second rubber composition.

8 Claims, 3 Drawing Sheets

(52) U.S. Cl.
CPC ...... *B60C 11/0066* (2013.01); *B60C 11/0309* (2013.01); *B60C 2011/0025* (2013.01); *B60C 2011/0386* (2013.01)

(58) Field of Classification Search
USPC ...................................................... 152/209.5
See application file for complete search history.

(56) References Cited

OTHER PUBLICATIONS

Dynamic mechanical analysis on Wikipedia.org, published on Apr. 18, 2010.*
Dynamic modulus on Wikipedia.org, published on Oct. 18, 2011.*
Dynamic mechanical analysis on https://www.coursehero.com, published on Oct. 12, 2004.*

* cited by examiner

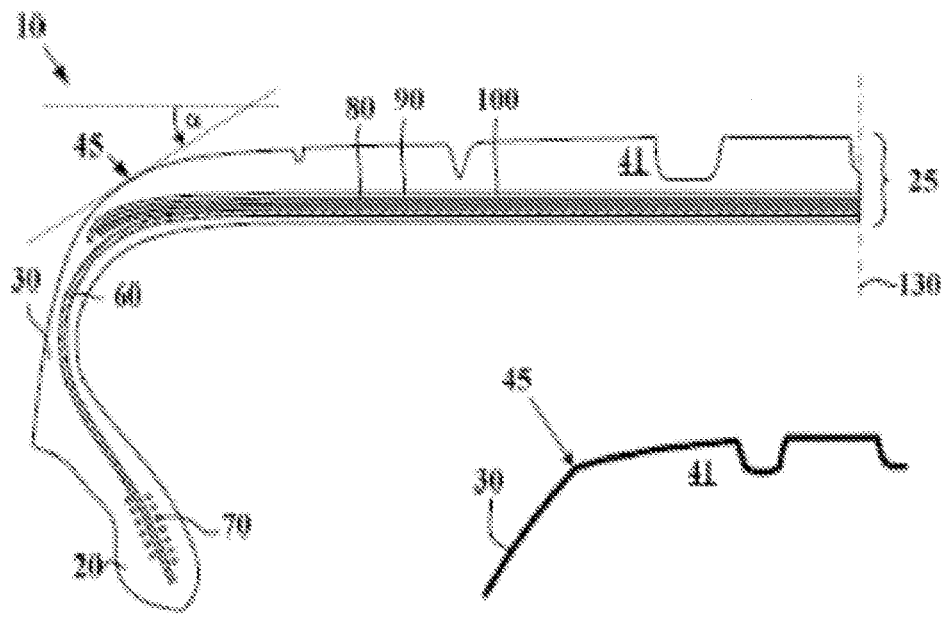
FIG. 3
(PRIOR ART)
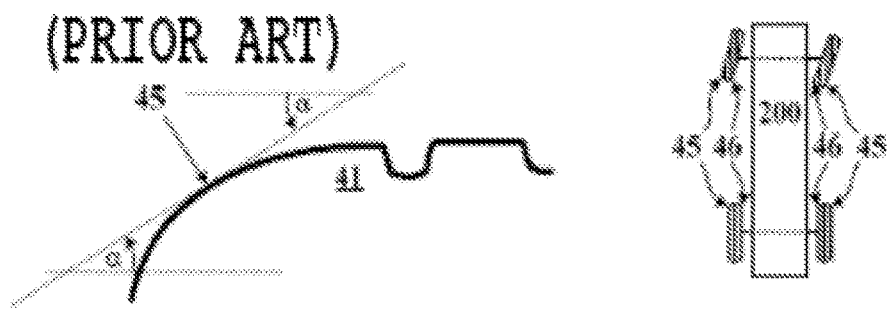
FIG. 4
FIG. 6
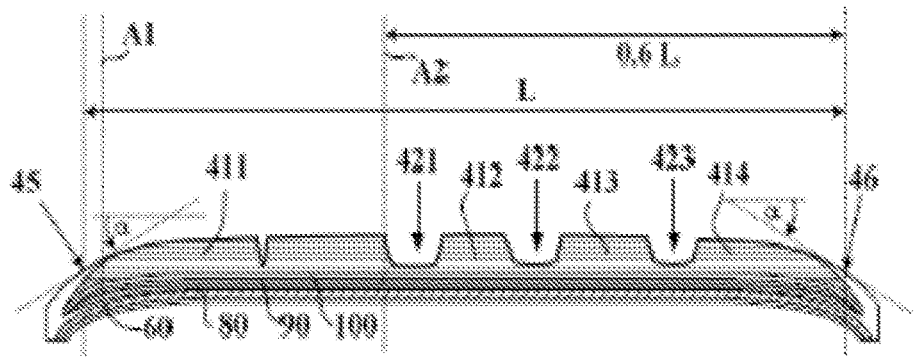
FIG. 5
FIG. 7

TIRE COMPRISING AN IMPROVED TREAD

RELATED APPLICATIONS

This is a U.S. National Phase Application under 35 USC 371 of International Application PCT/EP2014/063087 filed on Jun. 23, 2014.

This application claims the priority of French application no. 13/56387 filed Jul. 1, 2013, the entire content of which is hereby incorporated by reference.

FIELD OF THE INVENTION

The present invention relates to passenger vehicle tires. It relates more particularly to tires suited to sporty on-road driving.

BACKGROUND

The grip of the tires on the ground over which they are running is, for a vehicle fitted with tires, one of the most important features from a driver's safety standpoint. It is also the key to the performance of the vehicle during sporty on-road driving: if its tires lose their ability to steer as a result of a lack of grip, the vehicle can no longer be steered.

Tires suited to sporty on-road driving and more particularly intended for track use have been improved to offer excellent grip on dry ground. Tire manufacturers have notably developed rubber compositions for a tread that allow this result to be achieved. By contrast, tires provided with such treads often suffer from premature wear.

SUMMARY OF THE INVENTION

One of the objectives of the present invention is therefore to provide a tire for sporty on-road driving that has good resistance to wear while at the same time maintaining excellent grip on dry ground.

This objective is achieved by a tire intended to be mounted on a mounting rim of a vehicle wheel and having a predetermined direction of mounting on the vehicle, comprising a tread extending between an outboard axial edge and an inboard axial edge, the inboard axial edge being the edge intended to be mounted on the side facing the body shell of the vehicle when the tire is mounted on the vehicle in the said predetermined direction of mounting, the distance between the outboard axial edge and the inboard axial edge of the tread in the new state defining a width L of the tread. The tread comprises N circumferential ribs, N being a whole number greater than or equal to 4 (and preferably equal to 4), separated by N−1 circumferential grooves each one comprising two lateral walls, the mean axial distance between the two lateral walls of each groove being greater than or equal to 5 mm and less than or equal to 20 mm. The circumferential rib adjacent to the outboard axial edge of the tread extends, in any radial section and over the entire radial depth of the tread, from a first axial position, of which the axial distance with respect to the inboard axial edge of the tread is greater than or equal to 0.95·L, to a second axial position, of which the axial distance with respect to the inboard axial edge of the tread is less than or equal to 0.6·L. The circumferential rib adjacent to the outboard axial edge of the tread comprises a first portion made from a first rubber composition and a second portion axially adjacent to the first portion and made from a second rubber composition different from the said first rubber composition. The first portion extends, in any radial section and over the entire radial depth of the tread, from the said first axial position to a third axial position of which the axial distance with respect to the inboard axial edge of the tread is less than or equal to 0.85·L, the second portion of the circumferential rib extending from the said third axial position to the said second axial position. The said first and second rubber compositions comprise at least one elastomer and at least one reinforcing filler comprising a carbon black, the carbon black representing a percentage greater than or equal to 50% and less than or equal to 100% of the weight of all of the reinforcing filler, and the said first rubber composition has: an elastic modulus at 300% deformation which is greater than 1.1 times and less than or equal to 2.1 times the elastic modulus at 300% deformation of the said second rubber composition; a Shore A hardness which is greater than or equal to 0.95 times (and preferably greater than or equal to 0.98 times) and less than or equal to 1.20 times the Shore A hardness of the said second rubber composition; a complex modulus G* at 60° C. (which is measured at a stress of 0.7 MPa) which is greater than or equal to 1.00 (and preferably 1.03 times) and less than or equal to 2.1 times the complex modulus G* at 60° C. of the said second rubber composition.

This tire has good wear resistance, notably for "track day" style of driving, while at the same time maintaining excellent grip on dry ground. The improvement in wear is due to a careful choice of the rubber composition forming the first portion of the circumferential rib adjacent to the outboard axial edge of the tread.

According to a first preferred embodiment, the first portion extends, in any radial section and over the entire radial depth of the tread, from the said first axial position to a third axial position of which the axial distance with respect to the inboard axial edge of the tread is greater than or equal to 0.7·L, and preferably greater than or equal to 0.8·L. This embodiment makes it possible to obtain a particularly advantageous compromise between on-track wear and grip on dry ground. If the third axial position is at an axial distance with respect to the inboard axial edge of the tread that is less than 0.7·L, lap times are significantly impaired.

According to a second preferred embodiment, the elastic modulus at 300% deformation of the said first rubber composition is greater than or equal to 3 MPa and less than or equal to 3.5 MPa (and preferably 3.45 MPa). Values markedly below 3 MPa have the effect of worsening wear; values significantly in excess of 3.5 MPa impair the grip of the tire.

According to a third preferred embodiment, the Shore A hardness of the said first rubber composition is greater than or equal to 67 and less than or equal to 69. Values significantly below 67 have the effect of worsening wear and of impairing behaviour on dry ground; values significantly higher than 69 impair the grip of the tire both on dry ground and on wet ground.

According to a fourth preferred embodiment, the complex modulus G* at 60° C. of the said first rubber composition is greater than or equal to 1.00 and less than or equal to 1.15 MPa. Values significantly lower than 1 have the effect of worsening wear; values significantly higher than 1.15 impair the grip of the tire both on dry ground and on wet ground.

According to a fifth preferred embodiment, the said first rubber composition has a complex modulus G* at 10% and 100° C. which is greater than or equal to 0.95 times and less than or equal to 1.25 times (and preferably 1.22 times) the complex modulus G* at 10% and 100° C. of the said second rubber composition.

According to a sixth preferred embodiment, the complex modulus G* at 10% and 100° C. is greater than or equal to 1.40 and less than or equal to 1.80 MPa. Values significantly lower than 1.40 have the effect of worsening wear and impairing behaviour on dry ground; values significantly higher than 1.80 impair the grip of the tire both on dry ground and on wet ground.

Of course, it is possible and even desirable to combine two or more of the embodiments described.

BRIEF DESCRIPTION OF THE DRAWINGS

FIG. 3 depicts, in radial section, one quarter of a tire according to the prior art.

FIGS. 4 and 5 illustrate how the axial edge of a tread is determined.

FIG. 6 illustrates the terms "inboard edge" and "outboard edge" of a tread.

FIG. 7 schematically depicts the crown of a reference tire, in radial section.

DETAILED DESCRIPTION OF THE DRAWINGS

Figure 1:
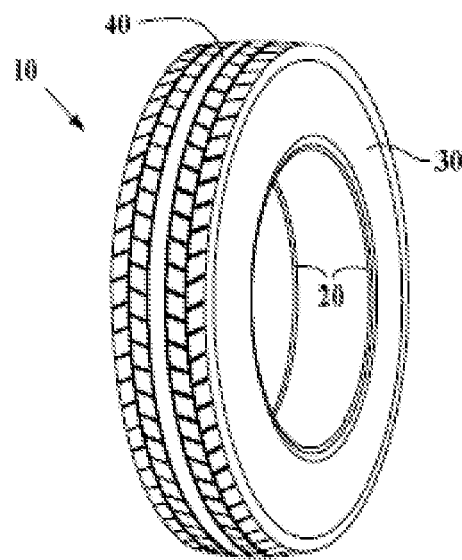
FIG. 1 depicts a tire according to the prior art.

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction of smaller (or larger) radii. It is this sense of the term that applies also when matters of radial distances are being discussed.

By contrast, a thread or a reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, a cord, a folded yarn or an equivalent assembly, irrespective of the material of which the thread is made or of the surface treatment it has received in order to encourage it to bond with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the mid-plane of the tire than is the point P6. Conversely, a point P7 is said to be "axially outside" a point P8 (or "axially on the outside of" the point P8) if it is further away from the mid-plane of the tire than is the point P8. The "mid-plane" of the tire is the plane which is perpendicular to the axis of rotation of the tire and which lies equal distances from the annular reinforcing structures of each bead.

A "circumferential" direction is a direction which is perpendicular both to a radius of the tire and to the axial direction. A "circumferential section" is a section on a plane perpendicular to the axis of rotation of the tire.

A "tread surface" here means the collection of points on the tread of a tire which are liable to come into contact with the ground as the tire is being driven on.

The expression "rubber composition" denotes a composition of rubber containing at least one elastomer and a filler.

When an element of the tire is said to be made of "a" (first or second) rubber composition, that does not mean that it is necessarily made from one rubber composition alone; it also encompasses elements made from a plurality of rubber compositions each of which has the features of the said rubber composition.

The "elastic modulus at 300% deformation" of a rubber composition means the secant modulus of extension obtained in tension in accordance with the 1998 standard ASTM D 412 (test specimen "C"; thickness 2.5 mm): the apparent secant moduluses at 300% elongation, denoted "MA300" and expressed in MPa (under normal temperature and humidity conditions in accordance with the 1999 standard ASTM D 1349), are measured during second elongation (which means to say after an accommodation cycle).

In the present document, the terms "elastic modulus G'" and "viscous modulus G''" refer to dynamic properties well known to those skilled in the art. These properties are measured on a Metravib VA 4000 type viscoanalyser using test specimens moulded from raw compositions or bonded test specimens taken from cured compositions. Test specimens such as those described in the standard ASTM D 5992-96 (the version published in September 2006, initially approved in 1996) in Figure X2.1 (circular procedure) are used. The diameter "d" of the test specimen is 10 mm (and it therefore has a circular cross section of 78.5 mm²), the thickness "L" of each of the portions of rubber composition is 2 mm, giving a "d/L" ratio of 5 (contrary to the standard ISO 2856, mentioned in the ASTM standard, paragraph X2.4, which recommends a value d/L of 2).

In order to determine the modulus "G*" at 10% deformation and 100° C.", the response of a test specimen of vulcanized rubber composition subjected to a simple alternating sinusoidal shear loading at a frequency of 10 Hz and at the recommended stabilized temperature (100° C.) is recorded. The test specimen is loaded symmetrically about its equilibrium position. The measurements are taken during a sweep in amplitude of deformation from 0.1% to 50% (on the outbound cycle), then from 50% to 0.1% elastic on the return cycle). The result used is the dynamic shear modulus (G') and the viscous shear modulus (G'') at 10% deformation on the return cycle.

The "complex modulus" G* is defined as being the absolute value of the complex sum of the elastic modulus G' and viscous modulus G'': G*=|G'+i·G''|.

In order to determine the modulus "G* at 60° C.", the same approach is taken except that the response of the test specimen to a simple alternating sinusoidal shear loading is recorded, at a frequency of 10 Hz, during a temperature sweep between 0° and 100° C., under a fixed stress of 0.7 MPa. The modulus G* is determined from the values measured at a temperature of 60° C.

The Shore A hardness of the compositions after curing is assessed in accordance with the standard ASTM D 2240-86.

In order to make the description of the alternative forms explained with the aid of the figures easier to understand, the same references are used to denote elements of identical structure.

FIG. 1 schematically depicts a tire 10 according to the prior art. The tire 10 has a crown comprising a crown reinforcement (not visible in FIG. 1) surmounted by a tread 40, two side walls 30 extending the crown radially inwards, and two beads 20 radially on the inside of the side walls 30.

Figure 2:
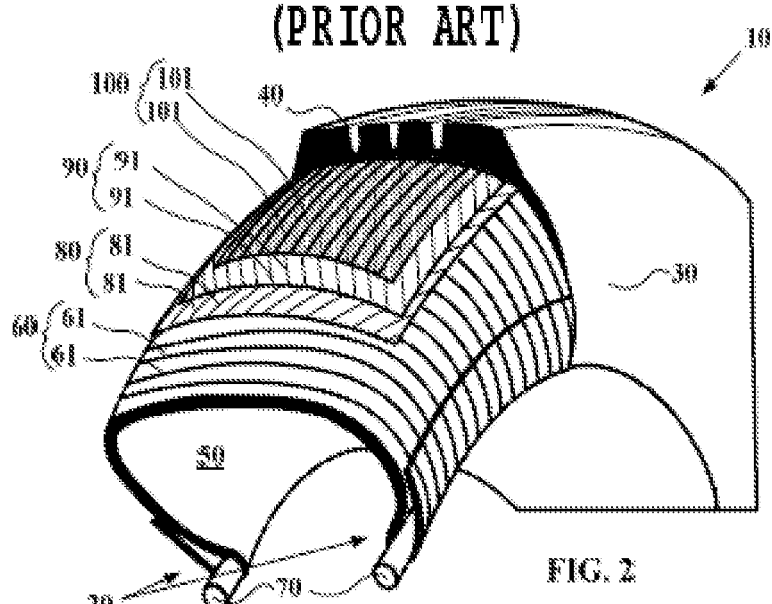
FIG. 2 depicts a partial perspective view of a tire according to the prior art.

FIG. 2 schematically depicts a partial perspective view of a tire 10 according to the prior art and illustrates the various components of the tire. The tire 10 comprises a carcass reinforcement 60 made up of threads 61 coated in rubber composition, and two beads 20 each one comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with filamentary reinforcing elements 81 and 91 which are parallel within each layer and crossed from one layer to the other, making angles of between 10° and 70° with the circumferential direction. The tire further comprises a hoop reinforcement 100, positioned radially on the outside of the crown reinforcement, this hoop reinforcement being formed of reinforcing elements 101 that are oriented circumferentially and wound in a spiral. A tread 40 is placed on the hoop reinforcement; it is this tread 40 which provides contact of the tire 10 with the road. The tire 10 depicted is a "tubeless" tire: it comprises an "inner liner" 50 made of a rubber composition impervious to the inflation gas, covering the interior surface of the tire.

FIG. 3 schematically depicts, in radial section, one quarter of a reference tire 10 of the "Pilot Sport 2" type marketed by Michelin. The tire 10 comprises two beads 20 intended to come into contact with a mounting rim (not depicted), each bead 20 comprising a plurality of annular reinforcing structures 70. Two side walls 30 extend the beads 20 radially towards the outside and meet in a crown 25 comprising a crown reinforcement formed of a first layer of reinforcing elements 80 and a second layer of reinforcing elements 90, and surmounted radially by a hoop reinforcement 100 which is itself surmounted radially by a tread. The mid-plane of the tire is indicated by the reference 130.

The way in which the axial edges of a tread are determined is illustrated in FIGS. 4 and 5 each of which shows the profile of a half-tread 41 and of the part of the side wall adjacent thereto. In certain designs of tire, the transition from the tread to the side wall is very pronounced, as in the case depicted in FIG. 4, and the axial edge 45 of the half-tread 41 is determined intuitively. However, there are tire designs in which the transition between the tread and the side wall is continuous. An example is depicted in FIG. 5. The edge of the tread is then determined as follows. The tangent to the tread surface of the tire at any point on the tread surface in the region of transition between the tread and the side wall is plotted, in a radial section of the tire. The axial edge is the point at which the angle α (alpha) between the said tangent and an axial direction is equal to 30°. When there are several points for which the angle α (alpha) between the said tangent and an axial direction is equal to 30°, it is the radially outermost point that is adopted. In the case of the tire depicted in FIG. 3, the axial edge 45 has been determined in this way.

Each layer of reinforcing elements 80 and 90 comprises filamentary reinforcing elements coated in a matrix formed of rubber composition. The reinforcing elements of each layer are substantially mutually parallel; the reinforcing elements of the two layers are crossed from one layer to the other at an angle of around 20°, as is well known to those skilled in the art for tires of the radial type.

The tire 10 further comprises a carcass reinforcement 60 which extends from the beads 20 through the side walls 30 as far as the crown 25. This carcass reinforcement 60 here comprises filamentary reinforcing elements oriented substantially radially, which means to say making an angle greater than or equal to 80° and less than or equal to 90° with the circumferential direction.

The carcass reinforcement 60 comprises a plurality of carcass reinforcing elements; it is anchored in the two beads 20 between the annular reinforcing structures 70.

FIG. 7 schematically depicts the crown of a reference tire which is intended to be mounted on a mounting rim (not depicted) of a wheel of a vehicle and that has a predetermined direction of mounting on the vehicle. This tire comprises a tread extending between an outboard axial edge 45 and an inboard axial edge 46, the inboard axial edge being the edge intended to be mounted on the side facing the body shell of the vehicle 200 when the tire is mounted on the vehicle 200 in the said predetermined direction of mounting (see FIG. 6). The distance between the outboard axial edge 45 and the inboard axial edge 46 of the tread in the new state defines a tread width L.

Figure 8:
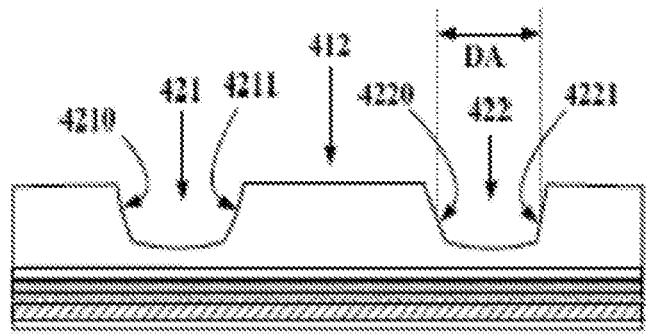
FIG. 8 illustrates the various parameters that characterize a central rib.

The tread comprises four circumferential ribs 411 to 414, separated by three circumferential grooves 421 to 423 each one comprising two lateral walls. FIG. 8 shows a detail of FIG. 7, namely the rib 412 and the two circumferential grooves 421 and 422 adjacent to it. Each of these grooves comprises lateral walls (4210, 4211 and 4220 and 4221, respectively). The mean axial distance DA between the two lateral walls of each groove is greater than or equal to 5 mm and less than or equal to 20 mm.

The circumferential rib 411 adjacent to the outboard axial edge 45 of the tread extends, in any radial section and over the entire radial depth of the tread, from a first axial position A1, of which the axial distance with respect to the inboard axial edge of the tread is greater than or equal to 0.95·L, to a second axial position A2, of which the axial distance with respect to the inboard axial edge of the tread is equal to 0.6·L. In this particular instance, the first and second axial positions A1 and A2 evolve according to the radial depth of the tread; in the figure, the positions A1 (at an axial distance equal to 0.97·L from the inboard axial edge 46) and A2 (at an axial distance equal to 0.60·L from the inboard axial edge 46) of the tread in the new (non-worn) state are indicated.

In this particular instance, the entire circumferential rib (and even the entire tread) is made of the same rubber composition comprising at least one elastomer and at least one reinforcing filler containing a carbon black, the carbon black representing a percentage greater than or equal to 50% and less than or equal to 100%, of the weight of all of the reinforcing filler.

Such a tire offers excellent grip on dry ground. By contrast, when used on track, premature wear is observed.

Figure 9:
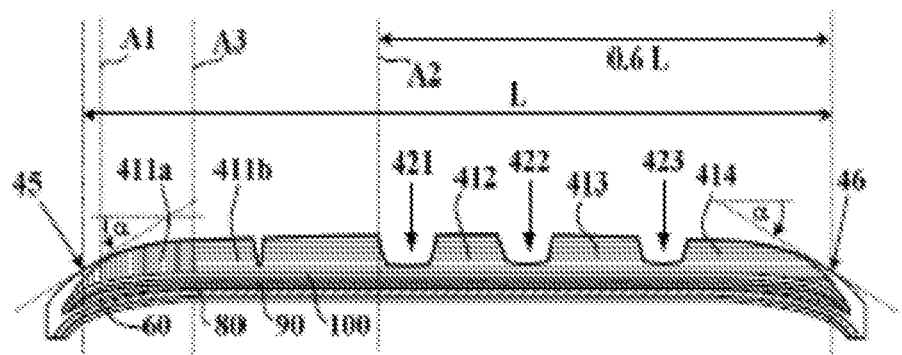
FIGS. 9 and 10 schematically depict the crown of a tire according to an embodiment of the invention, in radial section.
Figure 10:
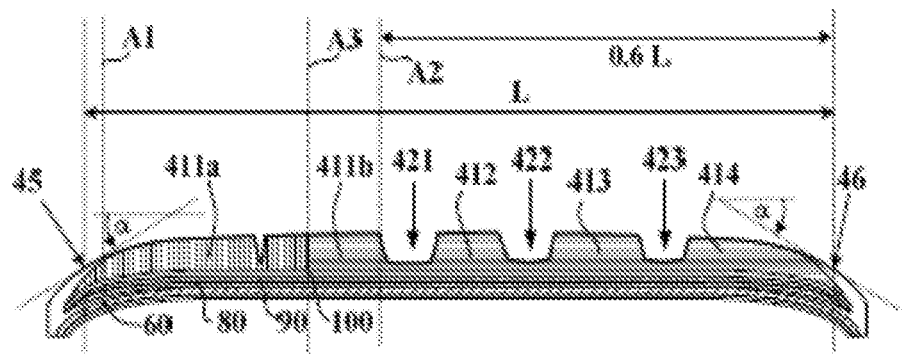

FIG. 9 schematically depicts the crown of a tire according to the invention that allows this problem to be overcome. Unlike in the reference tire depicted in FIG. 7, the circumferential rib adjacent to the outboard axial edge 45 of the tread comprises a first portion 411a made of a first rubber composition and a second portion 411b axially adjacent to the first portion and made of a second rubber composition different from the first rubber composition.

The first portion 411a extends, in any radial section and over the entire radial depth of the tread, from the first axial position A1 to a third axial position A3 of which the axial distance with respect to the inboard axial edge of the tread is, in this instance, equal to 0.85·L. The second portion 411b of the circumferential rib extends from this third axial position A3 as far as the second axial position A2. In this particular instance, the third axial position A3 does not vary according to the radial depth of the tread, but it would be perfectly conceivable to plan such a variation, so as to make the behaviour of the tread dependent on its degree of wear.

The first and second rubber compositions each comprise at least one elastomer and at least one reinforcing filler containing a carbon black, the carbon black representing a percentage greater than or equal to 50% and less than or equal to 100% of the weight of all of the reinforcing filler.

In a tire according to the invention, the first rubber composition has:
- an elastic modulus at 300% deformation which is greater than 1.1 times and less than or equal to 2.1 times the elastic modulus at 300% deformation of the said second rubber composition;
- a Shore A hardness which is greater than or equal to 0.95 times (and preferably 0.98 times) and less than or equal to 1.20 times the Shore A hardness of the said second rubber composition;
- a complex modulus $G^*$ at 60° C. which is greater than or equal to 1.0 times (and preferably 1.03 times) and less than or equal to 2.1 times the complex modulus $G^*$ at 60° C. of the said second rubber composition.

Table I gives, by way of example, the composition of rubber compositions that can be used. The composition is given in phr (per hundred rubber), which means parts by weight for 100 parts by weight of elastomer (rubber).

TABLE I

| | First rubber composition | Second rubber composition |
|---|---|---|
| Elastomer SBR 1739 [1] | 70 | — |
| Elastomer SBR 2382 [2] | 30 | — |
| Elastomer SBR 2158 [3] | — | 85 |
| Elastomer BR ND 343 [4] | — | 15 |
| N 134 [5] | 80 | 105 |
| Silica [6] | 25 | — |
| Coupling agent [7] | 2 | — |
| Plasticizer TDAE [8] | 37 | 7 |
| Plasticizer MES [9] | — | 18 |
| Thermoplastic resin [10] | 24 | 40 |
| Ozone wax C32 ST | 1.5 | 1.5 |
| Antioxidant [11] | 2.5 | 2.5 |
| ZnO | 1.8 | 1.8 |
| Stearic acid | 2.0 | 2.0 |
| Sulphur | 1.5 | 1.0 |
| Accelerator (CBS) | 3.5 | 2.5 |

Notes for Table I:
[1] ESBR with 40% stirene, 70% 1-4 trans polybutadiene units
[2] SSBR with 40.8% stirene, 46.5% 1-4 trans polybutadiene units
[3] SSBR with 26.5% stirene, 21% 1-4 trans polybutadiene units
[4] BR with 1.2% 1-4 trans polybutadiene units
[5] Carbon black series 130 (ASTM)
[6] Silica marketed by the Rhodia company under the name 160 MP
[7] TESPT ("SI 69" from the Evonik-Degussa company)
[8] TDAE ("Treated Distillate Aromatic Extract") oil
[9] MES ("Mild Extract Solvate") oil
[10] Polylimonene resin 9872
[11] 6PPD: N-(1,3-dimethylbutyl)-N'-phenyl-p-phenylenediamine The rubber compositions are preferably based on at least one diene elastomer, a reinforcing filler and a crosslinking system.

A "diene" elastomer (or equally rubber) means in the known way an elastomer derived at least in part (i.e. a homopolymer or a copolymer of) from diene monomers, which means to say monomers bearing two carboncarbon double bonds which may or may not be conjugated. The diene elastomer used is preferably selected from the group consisting of polybutadienes (BR), natural rubber (NR), synthetic polyisoprenes (IR), butadiene-styrene copolymers (SBR), isoprene-butadiene copolymers (BIR), isoprene-styrene copolymers (SIR), butadiene-styrene-isoprene copolymers (SBIR) and blends of these elastomers.

One preferred embodiment consists in using an SBR elastomer (E-SBR or S-SBR) used cut or not cut with another elastomer, for example of the BR type.

According to other embodiments, the diene elastomer may consist, in full or in part, of another diene elastomer such as, for example, an "isoprene" elastomer, which means to say a homopolymer or a copolymer of isoprene, in other words a diene elastomer selected from the group consisting of natural rubber (NR), synthetic polyisoprenes (IR), the various copolymers of isoprene and blends of these elastomers.

The isoprene elastomer is then preferably natural rubber or a synthetic polyisoprene of cis-1,4 type. Of these synthetic polyisoprenes, preference is given to use of polyisoprenes that have a cis-1,4 bond content (mol %) greater than 90%, more preferably still greater than 98%.

The rubber composition may also contain all or some of the additives usually employed in the rubber matrices intended for the manufacture of tires, such as, for example, reinforcing fillers such as carbon black or inorganic fillers such as silica, coupling agents for inorganic fillers, anti-ageing agents, antioxidants, plasticizers or extension oils, whether the latter be aromatic or nonaromatic in nature (notably oils which are nonaromatic or very weakly aromatic, for example of the naphthene or paraffin type, with high or preferably low viscosity, MES or TDAE oils, plasticizing resins with a high Tg in excess of 30° C.), agents improving the workability (processability) of the compositions in the uncured state, tackifying resins, a crosslinking system based either on sulphur or on sulphur donors and/or on peroxide, accelerators, vulcanization activators or retarders and anti-reversion agents.

The compositions are manufactured in suitable mixers, using two successive preparation phases well known to those skilled in the art: a first phase of thermomechanical kneading or work (the so-called "non-productive" phase) at high temperature, up to a maximum temperature of between 110° C. and 190° C., preferably between 130° C. and 180° C., followed by a second phase of mechanical work (the so-called "productive" phase) down to a lower temperature, typically below 110° C., during which finishing phase the crosslinking system is incorporated.

By way of example, the non-productive phase is carried out in a single thermomechanical step lasting a few minutes (for example between 2 and 10 min) during which all the required basic ingredients and other additives, except for the crosslinking or vulcanization system, are introduced into a suitable mixer such as a conventional internal mixer. After the mixture thus obtained has cooled, the vulcanization system is then incorporated in an open mixer such as an open mill kept at a low temperature (for example between 30° C. and 100° C.). The whole is then mixed (productive phase) for a few minutes (for example between 5 and 15 min).

The vulcanizing (or curing) may be carried out in the known way at a temperature generally of between 130° C. and 200° C., preferably under pressure, for a sufficient length of time which may vary for example between 5 and 90 min, notably according to the curing temperature, to the vulcanization system adopted and to the vulcanization dynamics of the composition in question.

Table II provides the properties of the rubber compositions the composition of which is indicated in Table I.

TABLE II

| | First rubber composition | Second rubber composition | Ratio |
|---|---|---|---|
| Elastic modulus at 300% | 3.37 | 2.33 | 1.45 |
| Shore A | 67.5 | 68.5 | 0.985 |
| G* at 60° C. | 1.15 | 0.96 | 1.20 |
| G* at 10% and 100° C. | 1.54 | 1.47 | 1.05 |

Tests were carried out on a Porsche 911 vehicle equipped with Pilot Sport Cup 2 tires of size 235/35 R19 and 305/30 R 19, on the Nardo circuit (in Italy) and Jerez circuit (in Spain). A tire equipped with a tread as depicted in FIG. 9 (using the rubber compositions of Table I) was compared, for the same tread pattern design, to a reference tire equipped with a tread as depicted in FIG. 7, made entirely from the second rubber composition of Table I. The tires according to the invention allowed a significant reduction in circuit wear (which means that the user can make approximately twice as many "circuit club" sorties compared with the reference tire) without impairing his timing performance; in some cases, the lap time is even slightly reduced.

The invention claimed is:

1. A tire adapted to be mounted on a mounting rim of a vehicle wheel and having a predetermined direction of mounting on a vehicle, comprising a tread extending between an outboard axial edge and an inboard axial edge, the inboard axial edge being the edge intended to be mounted on the side facing the body shell of the vehicle when the tire is mounted on the vehicle in the predetermined direction of mounting, the distance between the outboard axial edge and the inboard axial edge of the tread in the new state defining a width L of the tread;

wherein the tread comprises N circumferential ribs, N being a whole number greater than or equal to 4, separated by N−1 circumferential grooves each one comprising two lateral walls, the mean axial distance between the two lateral walls of each groove being greater than or equal to 5 mm and less than or equal to 20 mm;

wherein the circumferential rib adjacent to the outboard axial edge of the tread extends, which is configured to be in contact with a road surface, in any radial section and over the entire radial depth of the tread, from a first axial position, of which the axial distance with respect to the inboard axial edge of the tread is greater than or equal to 0.95·L, to a second axial position, of which the axial distance with respect to the inboard axial edge of the tread is less than or equal to 0.6·L;

wherein the circumferential rib adjacent to the outboard axial edge of the tread comprises a first portion made from a first rubber composition and a second portion axially adjacent to the first portion and made from a second rubber composition different from said first rubber composition, wherein the second axial position is an outboard lateral wall of the groove adjacent to the second portion of the circumferential rib adjacent to the outboard axial edge of the tread;

wherein the first portion extends, in any radial section and over the entire radial depth of the tread, from said first axial position to a third axial position of which the axial distance with respect to the inboard axial edge of the tread is greater than or equal to 0.8 L and less than or equal to 0.85 L, the second portion of the circumferential rib extending from said third axial position to said second axial position, wherein the ribs other than the circumferential rib adjacent to the outboard axial edge of the tread are the second rubber composition;

wherein said first and second rubber compositions comprise at least one elastomer and at least one reinforcing filler comprising a carbon black, the carbon black representing a percentage greater than or equal to 50% and less than or equal to 100% of weight of all of the reinforcing filler, and wherein said first rubber composition has:
an elastic modulus at 300% deformation which is greater than 1.1 times and less than or equal to 2.1 times the elastic modulus at 300% deformation of said second rubber composition;
a Shore A hardness which is greater than or equal to 0.95 times and less than or equal to 1.20 times the Shore A hardness of said second rubber composition;
a complex modulus G* at 60° C. which is greater than or equal to 1.00 times and less than or equal to 2.10 times the complex modulus G* at 60° C. of said second rubber composition.

2. The tire according to claim 1, wherein the elastic modulus at 300% deformation of said first rubber composition is greater than or equal to 3.00 and less than or equal to 3.5 MPa.

3. The tire according to claim 1, wherein the Shore A hardness of said first rubber composition is greater than or equal to 67 and less than or equal to 69.

4. The tire according to claim 1, wherein the complex modulus G* at 60° C. of said first rubber composition is greater than or equal to 1.00 and less than or equal to 1.15 MPa.

5. The tire according to claim 1, wherein said first rubber composition has a complex modulus G* at 10% and 100° C. which is greater than or equal to 0.95 times and less than or equal to 1.25 times the complex modulus G* at 10% and 100° C. of said second rubber composition.

6. The tire according to claim 1, wherein the complex modulus G* of the first rubber composition at 10% and 100° C. is greater than or equal to 1.40 and less than or equal to 1.80 MPa.

7. The tire according to claim 1, wherein N=4.

8. The tire according to claim 1, wherein the second rubber composition extends from the third axial position to the inboard axial edge of the tread.

* * * * *